United States Patent [19]
Nelles

[11] 3,910,174
[45] Oct. 7, 1975

[54] PIT BRINING

[75] Inventor: Jakob Nelles, Maquoketa, Iowa
[73] Assignee: Jakob Nelles, Maquoketa, Iowa
[22] Filed: Jan. 10, 1973
[21] Appl. No.: 433,018

[52] U.S. Cl. .................. 99/452; 99/535; 426/361
[51] Int. Cl.² ...................................... A01J 25/16
[58] Field of Search ............ 99/452, 453, 517, 534, 99/535; 62/394; 426/361

[56] References Cited
UNITED STATES PATENTS

| | | | |
|---|---|---|---|
| 1,561,503 | 11/1925 | Barry | 99/535 |
| 2,166,753 | 7/1939 | Derleth | 99/453 |
| 3,148,513 | 9/1964 | Ewing | 62/394 |
| 3,254,504 | 6/1966 | Thomas | 62/394 |
| 3,713,850 | 1/1973 | Gasbjerg | 99/535 |

*Primary Examiner*—Robert W. Jenkins
*Attorney, Agent, or Firm*—Quarles & Brady

[57] ABSTRACT

A system for cooling and curing pasta filata type cheese includes a brining pit holding a brine solution into which a number of cheese loaves may be immersed and an adjacent overflow reservoir which receives a portion of the brine solution from the brining pit. A sanitary pump draws the brine from the overflow reservoir through filtering and a heat exchanger to a brine return line which feeds the reconditioned salt-water solution back to the brining pit, thereby effecting a constantly circulated system. A brine mixer connected to the brine return line maintains the desired salinity of the brine.

6 Claims, 2 Drawing Figures

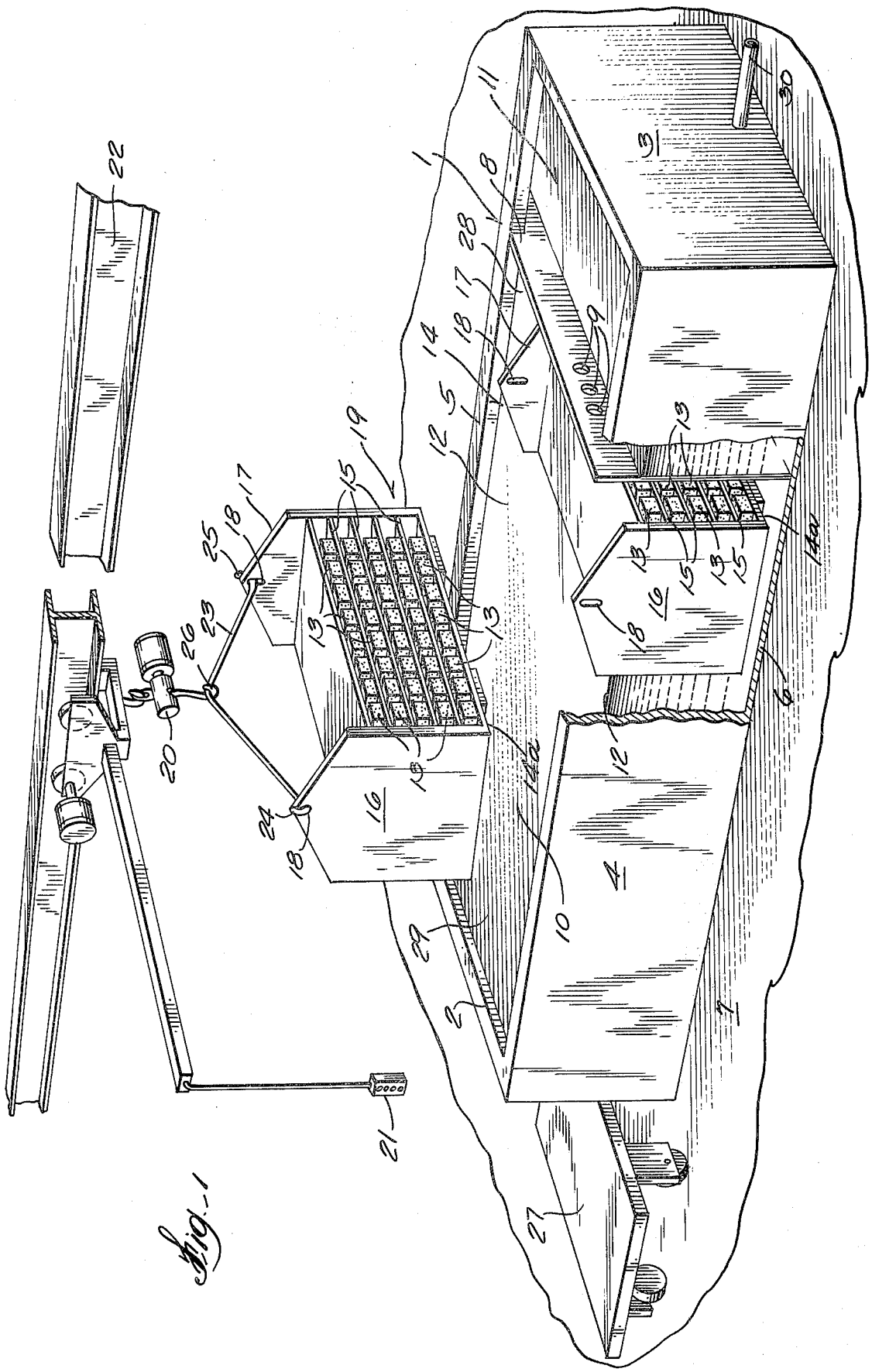

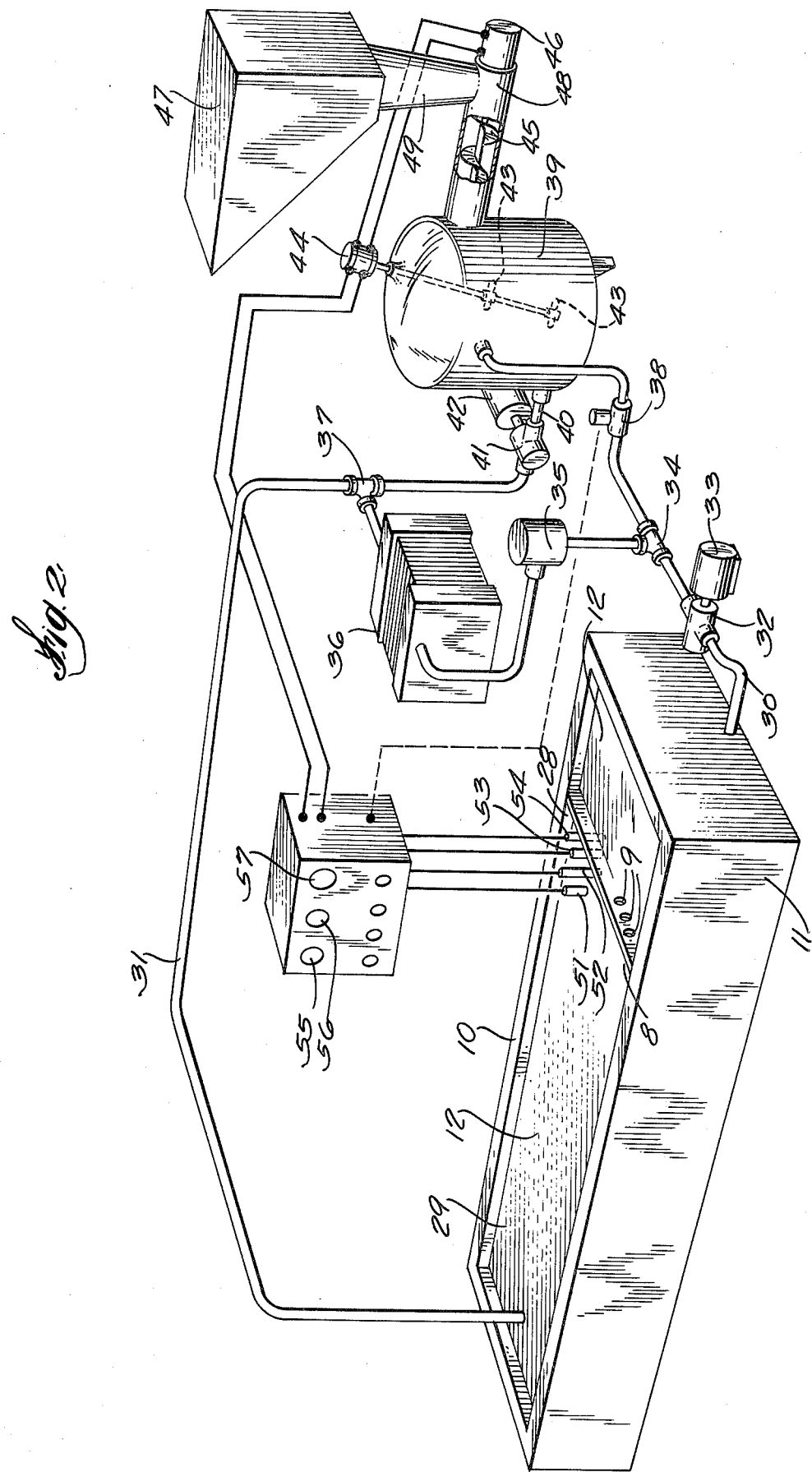

PIT BRINING

BACKGROUND OF THE INVENTION

In manufacturing semi-soft Italian cheeses, such as mozzarella and provolone, the curd is formed, heated until the proper acidity develops, and the curd becomes plastic, and then the curd is cut into strips, drained, stirred in hot water to increased plasticity, kneaded in hot water, shaped, partially cooled, and floated in a brine solution, sometimes for as long as several days. The last soaking stage during which the cheese absorbs salt from the brine is called brining. In the brining, the temperature of the cheese, which commonly is in the form of large loaves, must be dropped as swiftly as possible below 60° to stop bacterial action and prevent the formation of too much acid. Also the brine and brining equipment must be sanitary to prevent growth of harmful bacterial and development of noisome odors.

According to prior art brining techniques, the loaves of cheese are floated in a brine solution in an open top tank called a brining pit. The cheese is too light to sink. As a result, the cheese maker must periodically turn each of the loaves. The brine is cooled by refrigeration coils in the brining pit and by refrigerating the room in which the brining tank is located. Sometimes a thermostat is located in the brine to control refrigeration.

Notwithstanding the experience and the wisdom of ages of cheese making embodied in the prior art techniques and equipment for brining, the inventor discovered several substantial problems and defects inherent in the prior art that waste space, energy, labor and materials, and that effectively prevent the cheese maker from achieving quality control, product uniformity and high quality cheese. Because the cheese loaves float in the brine, a large square footage of brine surface is needed to brine even a portion of each batch of cheese made, and this wastes factory space and interferes with quality control and product uniformity because each batch must be fragmented for brining causing delay in brining and mixing of batches. Moreover, much labor is wasted in turning the loaves, energy is wasted in cooling the ambient atmosphere to protect the portion of cheese above the brine, and more energy is wasted because the cooled brine sinks to the bottom of the pit where it cannot contact the cheese, while the cheese floats in the relatively warm brine at the top. In the end, most of the prior art's refrigerating succeeds in cooling the cheese maker while the cheese and the acid producing bacteria remains warm and active. Finally, sanitation could be achieved only by periodically discarding the brine solution, cleaning the brine pit, and filling the brine pit with a new brine solution with resultant waste of salt and loss of production due to the downtime of the brining operation.

The present invention provides a pit brining apparatus and process that eliminates the foregoing problems and defects of the prior art.

SUMMARY OF THE INVENTION

The present invention relates to a system for brining cheese, and more particularly the invention resides in a pit brining apparatus that is comprised of a brining pit for holding the brine solution in which the cheese is brined, and an overflow reservoir to receive brine solution from the brining pit and a conduit circuit for circulating brine solution from the brining pit to the reservoir and back to the brining pit, the conduit circuit containing a brine cooler for cooling said brine solution. The conduit circuit may also include a brine mixer for replenishing the salt in the brine solution to maintain a predetermined salinity. The invention also resides in a pit brining apparatus that is comprised of a brining pit for containing a brine solution in which the cheese is soaked and a submersion rack for holding loaves of cheese to be brined and completely immersing said loaves of cheese beneath the surface of said brine solution. The invention also resides in a process for pit brining cheese that includes the steps of completely submerging cheese beneath the surface of a brine solution and continuously circulating said brine solution about said cheese and through a brine cooler and a brine filter.

The foregoing invention provides an improved automatically controlable pit brining arrangement which enables cheese makers to continuously produce cheese of the highest quality and uniformity with the greatest efficiency. Such advantages are obtained by maintaining absolute temperature control of the entire brine bath by precisely controlling the salinity and pH of the brine, and by simultaneously brining each batch of cheese manufactured. The brining system has the distinct advantage that it occupies only 1/10 of the floor space presently used in prior art pit brining and, by virtue of this space saving feature, allows for convenient installation in the ground or on the surface of the present factory floor. The combined use of the reservoir, cooling apparatus and brine return line ensures a constantly recirculating system that provides rapid cooling and maintaining of the entire brine bath below 60°F thereby enabling the daily production output of cheese to be vastly increased. Furthermore, this arrangement does not require that ambient atmosphere of the brining room be cooled and thus this invention conserves energy as well as physical space. The provision of an accompanying overflow chamber in conjunction with the filtering apparatus ensures that any foreign matter, such as foam, dust, milk solids, cheese pieces, or fat which may collect in the brining solution will be completely purged from the system before returning the constantly circulating brine to the brining chamber so as to effect optimum sanitary conditions so that the brine is cleaned and sediment and scums do not form in the brining pit. By automatically controlling the salt content of the mixture, an additional economical asset is furnished which saves cheese manufacturers approximately eighty cents per one hundred pounds of salt. Most important is the time and labor saving factor which allows for 70% less handling of the cheese due to the use of a submersion rack which facilitates complete exposure of the cheese to the brining solution and eliminates manual handling of the product. Using the submersion racks with an approximate capacity of two thousand pounds of cheese enables the manufacturer to efficiently transport the product by trolley and thus is much more practical and labor saving than present methods, and to brine each batch of cheese made at one time, allowing a high degree of product uniformity and quality control. Interaction of the heat exchanging device within the system offers periodic pasteurization of the brine mixture such that any appreciable yeast or bacterial buildup may be destroyed.

BRIEF DESCRIPTION OF THE DRAWINGS

In the drawings:

FIG. 1 is a partial isometric view of the pit brining system embodying the present invention with portions broken away to show a submersion rack loaded with cheese totally immersed in the brining solution of the brining pit and to show the reservoir.

FIG. 2 is a diagrammatic representation of the pit brining system partially shown in FIG. 1.

DETAILED DESCRIPTION OF THE DRAWINGS

Refer initially to FIG. 1 of the drawings, which illustrates a dual chambered tank 1 having end walls 2, 3, side walls 4, 5 and a bottom 6. For purposes of economy, durability and sanitation, the dual chambered tank 1 is constructed preferably of concrete lined with glazed ceramic tile and Epoxy grouting, but other materials, if approved by the Food and Drug Administration, may be used. The dual chambered tank 1 is shown mounted on top of a floor surface 7 in a cheese factory, but it should be understood that sunken installation may be made partially or totally below the level of the floor. A dividing wall 8 extends transversely across the dual chambered tank 1 between the side walls 4 and 5 to separate its two chambers, and the dividing wall 8 has a series of apertures 9 formed in it near its top, communicating between the two chambers.

The two chambers separated by the dividing wall 8 are a brining pit 10 on the left in FIG. 1 and an overflow reservoir 11 on the right. Normally the size of the dual chambered tank 1 is governed by the productive capacity of the cheese factory since it is desirable to brine several batches of cheese at once. For a cheese factory producing batches of cheese from 1,500 to 3,500 pounds each, the brining pit 10 is approximately thirty feet in length, eight feet in width and four or five feet in depth, and the reservoir 11 occupies about one fourth the volume of the brining tank 10 for the best results. Disposed within the brining tank 10 is a brine solution 12 or salt-water mixture 12, in which the cheese 13 is soaked, being completely immersed exposed to the brine 12 by operation of a stainless steel submersion rack 14.

The submersion rack 14 is made up of a bottom 14a with two transverse skids or feet 14b and 14c, and a pair of end panels 16 and 17 that extend upwardly from opposite ends of the bottom 14a. A plurality of shelves 15 extend between the end panels 16 and 17 above and parallel to the bottom 14a. The submersion rack 14 in this embodiment of the invention is built to hold two thousand pounds of cheese. An eye 18 is provided at the apex of each of the end panels 16 and 17 to receive hooks 25 of a handle 23, which in turn can be engaged by a hook 26 of a hoist 20 for hoisting the loaded submersion rack 14 into and out of the brining pit 10. The buoyant cheese loaves 13 are lighter or less dense than the brine 12 and would normally float to the surface of the brine solution 12, but the submersion rack 14 has sufficient weight to sink to the bottom of the brining tank 10, even when loaded with cheese 13. Each shelf 15 has an upwardly projecting lip (not shown) on its outer edge, which, being about equal to the clearance from the top of the cheese loaves 13 to the bottom of the next higher shelf 15, prevents the cheese loaves 13 from floating out of the submersion rack 14. Thus when the submersion rack 14 is immersed in the brining pit 10, the cheese loaves 13 float above the shelves 15, but are nevertheless held in the submersion rack 15 so that the brine solution 12 is able to circulate about all surfaces of the loaves 13 at all times.

FIG. 1 illustrates a second submersion rack 19 identical in structure to the rack 14 described above, so the same reference numerals will be used for the corresponding structures in the two racks 14 and 19. The racks 14 and 19 are hoisted and moved to positions over the brining tank 10 and returned by a traveling crane consisting of an electric hoist 20 which is controlled by a switch 21 and guided along a beam track 22 located medially above the reservoir. The handle 23, which as hooked ends 24 and 25 engaging the eyes 18 in the end panels 16 and 17 of the rack 19, is engaged by a hook 26 on the hoist 20 to lower and hoist the rack 19 into the pit brining system. A four wheeled dolly 27 is used to transport the racks 14 and 19 from a cooling station (not shown) to the brining pit 10, and after completion of brining, to the next stage in the process of cheese manufacturing. Thus all manual handling of the cheese loaves 13 in the brining step is eliminated and an entire batch of cheese so handled by the traveling crane and the racks 14 and 19. Forming the cheese into loaves 13 is currently a common practice, though the invention is in no way limited or conditioned by the oblong loaf shape of the cheese here shown. In fact, provolone cheese was traditionally formed in a rough spheriod, instead of a loaf, and in many places it still is so formed. The invention works as well with any shape.

A circuit of conduit circulates the brine solution 12 from its upper surface at one end of the brining tank 10, which can be thus designated an outlet end 28 and back to a lower depth in the opposite end of the brining pit 10, which can therefore be referred to as the inlet end 29 of the brining pit 10. This conduit circuit includes the overflow holes 9 in the end wall 8 of the outlet end 28 of the brining pit 10 communicating with the overflow reservoir 11, the overflow reservoir 11, an outlet pipe 30 at the bottom of the end of the overflow reservoir 11 and the return pipe 31 which carries the brine 12 back to the inlet end 29 of the brining pit 10, as well as all of the circuit components between the outlet pipe 30 and the inlet pipe 31, which are described below.

A sanitary pump 32 driven by an electric motor 33 is connected to the outlet pipe 30 coming from the reservoir, pumping the brine solution 12 from the reservoir 11 to a Y 34 in the outlet pipe 30. One side of the Y 34 is connected through a filter 35 to a heat exchanger 36, the outlet of which is connected to a Y 37 in the return pipe 31. The heat exchanger 36 may be connected to an ice bank, or preferably, to a refrigeration unit, to maintain the brine solution between 45° and 55°F in the brining pit 10, so it serves primarily as a brine cooler. However, if provision is also made to connect the heat exchanger 36 alternatively to a heat source such as steam, the heat exchanger 36 may also serve to pasteurize the brine solution 12 periodically to kill any harmful bacteria that may contaminate the brine solution 12.

The other side of the Y 34 in the outlet pipe 30 is connected through a power operated valve 38 to the top of a mixing tank 39, which has a drain pipe 40 at the bottom that is connected to a sanitary pump 41 driven by an electric motor 42. The outlet of the sanitary pipe 41 is connected to the Y 37 in the return pipe 31. The power operated valve 38 is normally closed, so that the normal circulation route for the brine solution 12 is through the filter 35 and the heat exchanger 36 to the return line 31 and the brining pit 10. However, when the power operated valve 38 is open, a portion of the brine solution 12 flows into the mixing tank 39 and out through the drain pipe 40 of the mixing tank 39 from which it is pumped by the sanitary pump 41 back through the return pipe 31 to the brining pit 10. The brine mixing tank 39 has power driven paddles 43 mounted in it to be driven by an air motor 44, and salt for the brine is fed into the mixing tank 39 through a feed auger 45 that is driven by an electric motor 46. A salt hopper 47 is mounted above an input end 48 of the feed auger 45 and connected to the feed auger 45 by duct 49. The brine mixer, which is made up of the above described components, produces a thick slurry of salt brine which is circulated through the brine solution 12 to replenish the salt absorbed by the cheese loaves 13 and to maintain the salinity of the brine solution 12 at a reading of 80 to 85 on a salinometer.

With the above described apparatus, it is possible to maintain a high degree of control over the temperature, salinity, and cleanliness of the brining step of the cheese manufacturing process performing standard periodic tests manually. However, such control may also be achieved more precisely by means of a continuous monitoring feedback control system which automatically actuates the elements of the apparatus described above. Central to such an automatic feedback system in the preferred embodiment is a control panel 50 which senses the temperature of the brine solution 12 with a thermostat 51, the salinity with a salinometer bulb 52 that is read by an electric eye 53, and the pH by an electrometric pH meter 54. The condition of the brine solution 12 may be read at any time on the dials 55, 56 and 57 on the control panel 50, which respectively report the temperature, salinity and pH of the brine solution 12 as detected by the thermostat 51, the salinometer 52 and the electrometric pH meter 54. Simultaneously with the sensing of these properties of the brine solution 12, the control panel 50 sends out control signals to the power operated valve 38 and the auger motor 46 and mixer motor 44, if the salinity drops below 70° to 80°, or to the refrigeration unit (not shown) if the temperature exceeds 55°. If the pH meter 54 reports that the brine solution 12 is becoming excessively acidic, it can be neutralized by the addition of lime or caustic. If the desired for quality control or other record keeping purposes, the condition of the brine solution 12 may be recorded by adding a conventional chart or graph recorder (not shown) to the control panel 50.

To start up the brining system of the present invention, salt is initially poured into the reservoir 11 and water added so that a brine solution is created and pumped out of the reservoir 11 through the outlet pipe 30 by the sanitary pump 32 and through the cooler 36 and the return pipe 31 to the brining pit 10. This procedure is continued until the brining pit 10 is full and the salinometer reading approaches 80° while the temperature in the brine pit is between 45° and 55°F. Then a load of cheese loaves 13 in the submersion rack 14 is hoisted from its dolly 27 by the traveling crane and lowered into the brining pit 10 until it rests on the bottom. The automatic feedback control system takes over from this point, when the addition of the loaded submersion rack 14 raises the level of the brine solution 12 in the brining pit 10 causing it to overflow through the overflow holes 9 in the dividing wall 8 into the reservoir 11 from where it is pumped by the sanitary pump 32 back through the cooler 36 and the return pipe 31 to the brining pit 10. This circulation of the brine solution 12 is continuous at a rate of about 70–80 gallons per minute.

When the salinity detected by the salinometer 52–53 drops below the 70–80 range, electrical signals from the control panel 50 open the power operated valve 38 admitting brine to the mixing tank 39 and the auger motor 46 begins feeding salt from the hopper 47 into the mixing tank 39 as the paddles 43 are rotated by the air motor 44. The salt slurry mixed up by the mixing tank 39 is pumped from the drain pipe 40 by a sanitary pump 41 and back to the brine solution 12 in the brining pit 10 through the Y 37 and the return pipe 31. While a portion of the brine solution 12 passes through the power operated valve 38 to the mixing tank 39, the remainder continues to be pumped through the cooler 36 so that the temperature of the brine solution 12 in the brining pit 10 is maintained within the range of 44° to 55°F at all times.

As the brine solution 12 is pumped through the brine cooler 36, it is also pumped through the filter 35 which removes all foreign substances from the brine solution 12 returning a clean brine solution 12 to the pit brining pit 10. At the discretion of the cheese maker, the pit brining system may be shut down to pasteurize the brine solution 12, and this is accomplished by disconnecting the heat exchanger 36 from the ice bank (not shown) or refrigeration unit (not shown) and connecting it to a source of heat (not shown), such as steam. The brine solution 12 is again pumped through the heat exchanger 36, which thus becomes a pasteurizer 36, killing all of the bacteria that may have developed or grown in it. When the entire brine solution has thus been pasteurized, the heat exchanger 36 may be converted to a cooler again by reconnecting it with the ice bank (not shown) or the refrigeration unit (not shown) and the brine solution 12 may be pumped through it until the temperature of the brine solution in the brining pit 10 is reduced to the 45° to 55°F range, when brining may be resumed.

The cheese may remain in the brining pit 10 for anywhere from eight hours to several days until the desired amount of salt is absorbed by the cheese loaves 13. Because the temperature of the brine solution 12 is constantly maintained in the range of 45° to 55°F and the cheese loaves 13 are completely immersed in the brine solution 12, the temperature of the cheese 13 is quickly dropped below 60° to 70°F, stopping all bacteria action so that the cheese 13 maintains its desired, optimal acidity. After the cheese 13 leaves the brining process, it is washed with water, and it may be finished by a water wash creating a smooth surface, and then sent to a cold storage or packaged as the needs of the cheese maker requires.

From the foregoing detailed description of the preferred embodiment of the present invention both the structure and operation of the invention are apparent and the objects and advantages are made manifest. Numerous variations in the embodiments of the invention may be made while still employing the essence of the invention. For example, the brining pit and the reservoir may be entirely separate and distinct. Although tile lined cement is the most economical and best construction presently known, obviously other materials may be used to make the brining tank and reservoir. It may be feasible in some embodiments to omit the reservoir 11, or if the reservoir is retained, the brine mixer may be connected directly to the reservoir. Clearly therefore, the foregoing and other variations may be made in the numerous possible embodiments of the invention without departing from its scope. Hence the invention is defined, not by the foregoing description of the preferred embodiment, but rather in the claims that follow.

I claim:

1. A brining apparatus for use in the manufacture of cheese comprising the combination of
    a brining pit to hold a brine solution being open at its top for the reception and removal of cheese;
    a reservoir for receiving said brine solution circulated from said brining pit;
    a conduit circuit connected between said brining pit and said reservoir for circulating said brine solution from said brining pit to said reservoir and back to said brining pit;
    a brine cooler responsive to a thermostat and having a heat exchanger to receive said recirculating brine and cool said circulating brine to maintain said brine solution in said brining pit within a predetermined temperature range; and
    a brine mixer having a mixing tank connected to alternately communicate with said conduit to receive said circulating brine solution, and to discharge a salt slurry into said conduit circuit and having an agitator in said mixing tank, and a salt hopper on said mixing tank and communicating with the interior of said mixing tank.

2. A brining apparatus as set forth in claim 1 wherein a filter is connected in said conduit circuit to filter foreign substances out of said brine solution.

3. A brining apparatus for use in manufacturing cheese comprising the combination of
    a brining pit to hold a brine solution and being open at the top for the reception and removal of cheese;
    a brine circulation system including a cooler to circulate said brine in said brining pit and to maintain a substantially uniform predetermined temperature range throughout said brine solution in said brining pit;
    and a submersion rack having a plurality of shelves for holding cheese to be brined and being of sufficient weight to sink to the bottom of said brining pit when fully loaded with cheese so as to completely immerse said cheese in said brine.

4. A brining apparatus as set forth in claim 3 wherein said brine circulation system includes an overflow reservoir communicating with said brining pit to receive brine solution from said brining pit.

5. A brining apparatus as set forth in claim 4 wherein said brine circulation system includes a brine cooler and a brine mixer connected in parallel between said overflow reservoir and said brining pit.

6. A brining apparatus as set forth in claim 5 wherein said brine mixer is connected between said brining pit and said overflow reservoir through normally closed power operated valves responsive to a salinometer to open when salinity of said brine solution drops below a present minimum.

* * * * *